Sept. 10, 1957     A. DE VERE HARNETT     2,805,536
POWER DRIVEN LAWN MOWER
Original Filed May 9, 1951     2 Sheets-Sheet 1
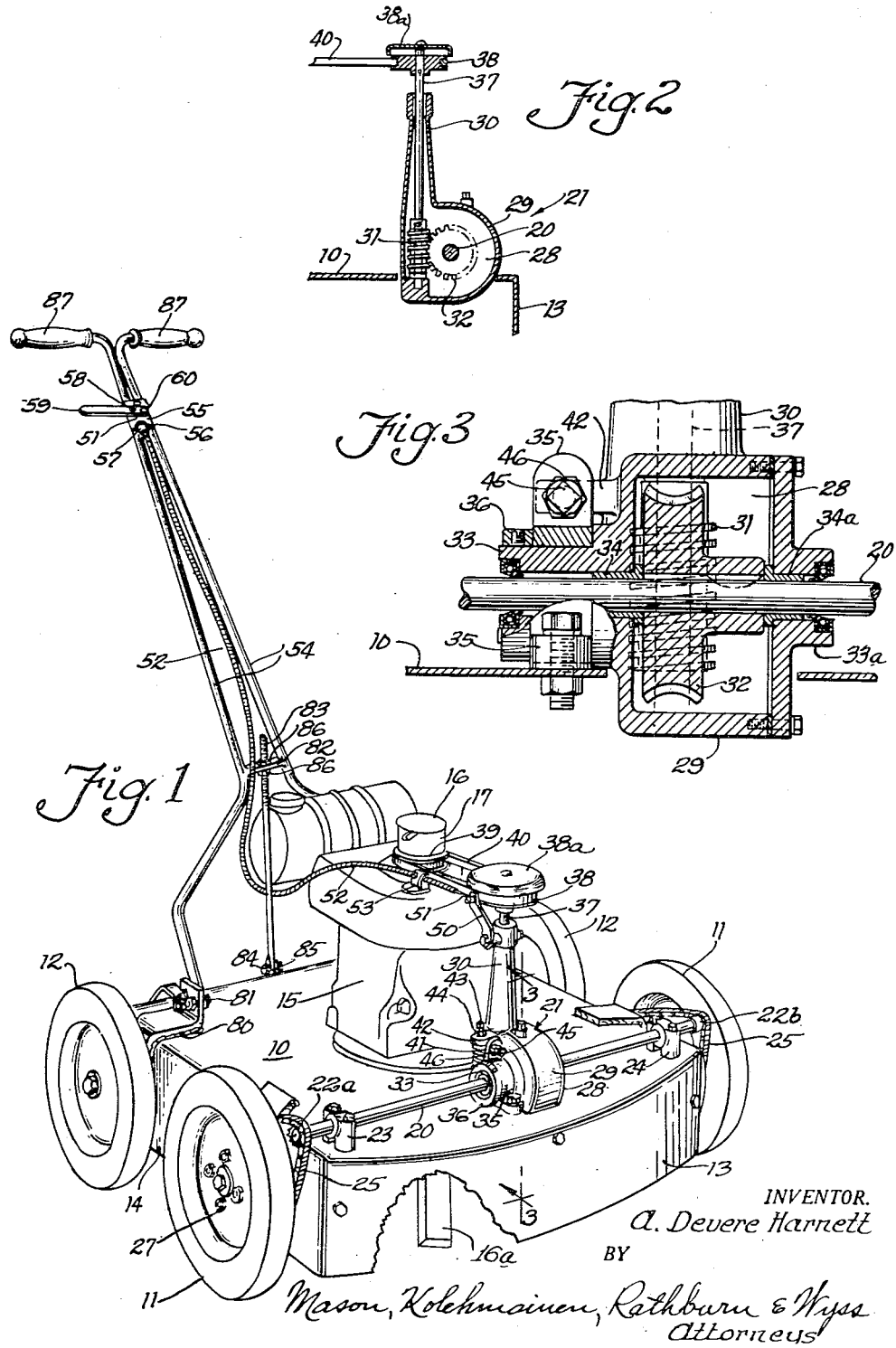
INVENTOR.
A. Devere Harnett
BY
Mason, Kolehmainen, Rathburn & Wyss
Attorneys Sept. 10, 1957  A. DE VERE HARNETT  2,805,536
POWER DRIVEN LAWN MOWER Original Filed May 9, 1951  2 Sheets-Sheet 2

INVENTOR.
A. Devere Harnett
BY
Mason, Kolehmainen, Rathburn & Wyss
Attorneys

United States Patent Office 2,805,536
Patented Sept. 10, 1957

2,805,536

POWER DRIVEN LAWN MOWER

A. De Vere Harnett, Racine, Wis.

Original application May 9, 1951, Serial No. 225,344, now Patent No. 2,701,436, dated February 8, 1955. Divided and this application July 29, 1954, Serial No. 446,525

5 Claims. (Cl. 56—25.4)

The present invention relates to power driven lawn mowers and, more particularly to power driven lawn mowers of the horizontal rotary cutting blade type and the invention has for an object the provision of a lawn mower of this character which is economical and simple in construction and reliable in operation, having a compact and rugged mower drive assembly and being conveniently adjustable with respect to the height of cut. This application is a division of applicant's copending application Serial No. 225,344, filed May 9, 1951, which issued as Patent No. 2,701,436 on February 8, 1955.

It is another object of the present invention to provide a new and improved power driven lawn mower wherein a simplified mower drive assembly having substantial speed reduction and operable from the handle of the mower is employed.

It is a further object of the present invention to provide a new and improved mower drive mechanism characterized particularly by its simplicity of construction, operation and efficiency.

It is a further object of the present invention to provide a power driven lawn mower of the two wheel drive type wherein a free wheeling mechanism is provided to permit manual maneuvering of the mower.

The invention, both as to its organization and method of operation, together with further objects and advantages thereof, will best be understood by reference to the following specification taken in connection with the accompanying drawings, in which:

Fig. 1 is a perspective view of a power driven lawn mower constructed in accordance with the principles of the present invention;

Fig. 2 is a fragmentary sectional view illustrating certain components of the front wheel drive assembly;

Fig. 3 is an enlarged sectional view taken along line 3—3 of Fig. 1;

Figure 4:
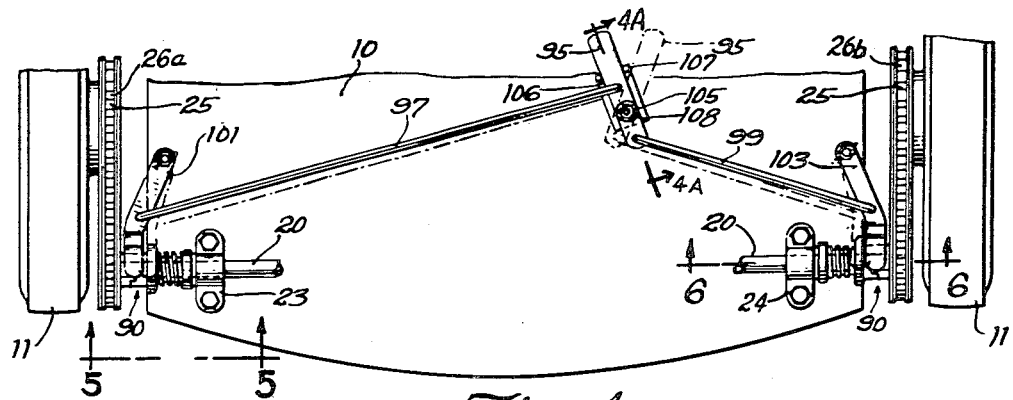
Fig. 4 is a plan view of an alternate embodiment of the invention wherein the front portion of the power driven mower is provided with a free wheeling mechanism.
Figures 5, 6:
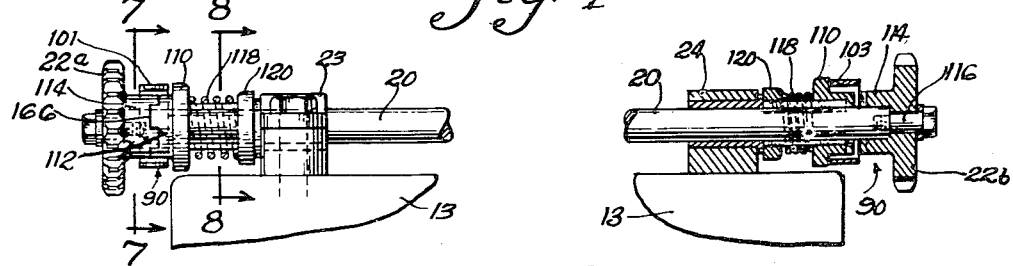
Fig. 5 is a side elevational view taken along the lines 5—5 in Fig. 4.
Fig. 6 is a fragmentary sectional view taken along the line 6—6 in Fig. 4.
Figures 7, 8:
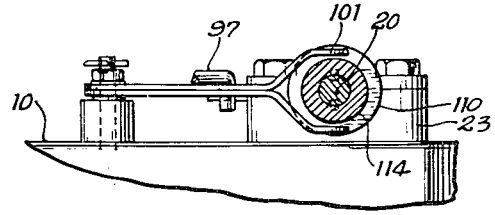
Figures 9, 10, 11:
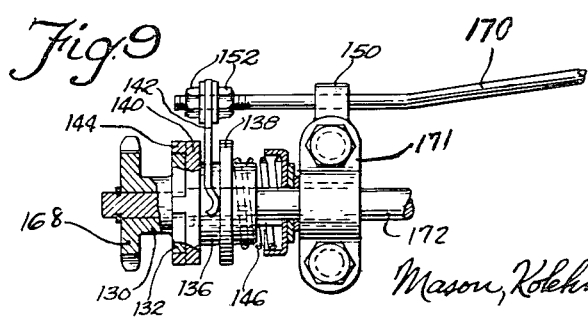

Figs. 7 and 8 are end elevational views, partly in section and respectively taken along the lines 8—8 and 9—9 of Fig. 5;

Fig. 9 is a plan view of an alternative embodiment of the free wheeling mechanism shown in Fig. 4;

Fig. 10 is a side elevational view of the combined clutch and sprocket member employed in the embodiment shown in Fig. 9; and Fig. 11 is a side elevational view of the clutch driving member employed in the embodiment of Fig. 9.

Referring now more particularly to the drawings, the power driven lawn mower of the present invention includes a cutter housing comprising a horizontal platform 10 which is supported for movement on the front wheels 11 and the rear wheels 12, and is provided with a front wall 13 and side walls 14 so as to define a confined air space open only to the ground. On top of the platform 10 there is provided a driving motor 15 which is preferably of the gasoline type, and supplies power to propel the wheel supported platform 10 and to rotate a horizontal cutter blade which is positioned within the housing defined by the top 10, front wall 13 and sides 14. Preferably the motor 15 is of the type having a shaft 16 extending therethrough to permit a power take-off at each end thereof and is so positioned that one end of the power shaft 16 is positioned beneath the platform 10 and the other end extends upwardly from the top of the motor. A horizontal cutter blade 16a is secured to the end of the power shaft 16 beneath the platform 10, and is rotated in a horizontal plane by the motor 15. The motor 15 may be started by any suitable means, when once started, remains in operation so that the cutter blade is continuously rotated and cuts the grass within the radius of rotation thereof in an obvious manner.

While it is desirable to permit the motor 15 continually to rotate the horizontal cutter blade so that a cutter throw-out mechanism is not required and a simplified construction is obtained, it is nevertheless necessary to provide a speed reducing mechanism to connect the mower wheels with the motor 15. Furthermore, the mower drive assembly should be operable from the mower handle so as to disengage the driving connection between the motor and the wheels when it is desired to stop the mower. In accordance with the present invention, these objectives are achieved by providing a front wheel drive mechanism includes a transverse drive shaft 20 positioned at the forward end of the mower. This drive mechanism comprises a worm and worm wheel assembly indicated generally at 21 on the central portion thereof and is provided with the drive sprockets 22a and 22b at either end of the drive shaft 20. As shown, the drive shaft 20 is preferably supported at its ends by means of bearings 23 and 24 which are mounted on the platform 10. Chains 25 are employed to connect the drive sprockets 22a and 22b with driven sprockets 26a and 26b, which are mounted on the inner hubs of the front wheels 11 by means of the bolts 27.

The worm wheel assembly 21 is provided with a housing 28 having a generally cylindrical portion 29 and an upstanding portion 30. Inside the portion 30 of the housing 28 there is journalled a shaft 37 which carries a worm 31. This worm engages a worm wheel 32, which is carried by the shaft 20 and is positioned within the housing portion 29. The housing portion 29 is also provided with sleeve extensions 33 and 33a at the sides thereof and inner bearings 34 and 34a are mounted in these extensions to support the assembly 21 for rotary movement about the shaft 20. Additional support for the drive shaft 20 and the housing assembly 21 is provided by an outer bearing 35 which is positioned about the sleeve 33 and is supported on the platform 10. A collar 36 on the outer end of the sleeve 33 prevents sidewise movement of the housing. It will be seen from the foregoing description that the assembly 21 is rotatable about the axis of the shaft 20 while permitting the worm 31 to drive the shaft 20 through the wheel 32. At its upper end the shaft 27 carries a pulley 38 which is positioned in the same horizontal plane as a pulley 39 mounted on the upper end of the drive shaft 16. A flexible belt 40 is used to connect the pulleys 38 and 39 so as to rotate the shaft 37 and the worm 31 when the belt is tight and the motor is operating. To prevent branches and the like from becoming entangled with the belt 40 and the pulley 38, a cap member 38a is provided which is positioned on the worm shaft 37 above the pulley 38 and overhangs the pulley. The top of the cap member 38a is preferably provided with a smooth rounded top so that branches and other objects are easily thrown off when the member is rotating. From the foregoing explanation, it will be evident that if the belt 40 is under tension, the motor 15 drives the shaft 20 at a reduced speed through the worm 31 and worm wheel 32 so as to propel the mower forwardly.

In order drivingly to engage the motor 15 with the drive shaft 20, means are provided for exerting a force on the housing 28 which tends to rotate the housing about the shaft 20 and move the pulley 38 away from the pulley 39, thereby to maintain the belt 40 under tension. Specifically, the above described force is exerted by positioning a compression spring 41 between the top of the platform 10 and an arm 42, which projects outwardly from the housing 28. The arm 42 is offset from the axis of the drive shaft 20 so that the spring 41 exerts a force upwardly on the arm 42 and tends to rotate the worm drive assembly in a clockwise direction around the drive shaft 20 when viewed from the lefthand side of the mower. The tension of the spring 41 may be adjusted by means of the adjusting screw 43 which is threaded through the arm 42 and operates to compress the spring 41, the screw 43 being locked in place by the lock nut 44. Movement of the housing 28 about the shaft 20 is limited by an adjustable stop screw 45 which is threaded through an upstanding lug portion on the outer bearing 35 to engage the side of the arm 42 and is locked in place by means of the nut 46.

In order to move the upper end of the worm drive housing toward the motor against the force of the spring 40, thereby to break the driving connection between the motor 15 and the wheels 11, an upwardly extending arm 50 is provided which is secured to the upper end of the upstanding housing portion 30 and is connected at its outer end to the inner control wire 51 of a Bowden wire control cable 52. The outer sheath of the cable 52 is held firmly in the clamp 53 mounted on top of the motor 15, and the cable extends from the motor 15 upwardly between the parallel arms 54 of the mower handle to a bracket 55 positioned on the upper end of the arms 54. The bracket 55 has an upturned portion 56 forming a stop and is provided with a sleeve 57 which clamps the outer sheath of the upper end of the cable 52 to prevent movement thereof. The control wire 51 is connected by means of a pin 58 to an intermediate point of a control lever 59, which is mounted for pivotal movement about its inner end by means of a pivot pin 60.

From the foregoing explanation it will be understood that the spring 41 normally exerts an upward force against the arm 42 and tends to rotate the worm housing 28 in such a direction that the pulley 38 is moved away from the motor and the belt 40 is held taut by the pulleys 39 and 38. With the belt 40 thus held taut the motor 15 drives the wheels 11 to propel the mower forward through the above-described worm gear assembly. When it is desired to stop the mower, the control lever 59 is pulled upwardly to draw the control wire 51 through the sheath 52 of the Bowden wire cable and thus rotate the assembly 21 toward the motor 15 against the bias of the compression spring 41. As a consequence, the belt 40 is loosened so that the driving connection between the motor 15 and the front wheel drive assembly is broken. Inasmuch as the spring 41 exerts a force tending to rotate the assembly 21 in a direction to tighten the belt 40, it is necessary to lock the control lever 59 in the motor disengaging position. Accordingly, when the lever 59 is moved upwardly by an amount sufficient to move the connecting pin 58 over center with respect to the pivot point 60, the control lever is locked in place and the motor remains disengaged from the drive assembly until the control lever 59 is again moved downwardly to the position shown in Fig. 1.

As best shown in Fig. 1, the lower ends of the handle arms 54 are pivotally supported by means of the bolts 81 in the upturned portions of reinforcing plates 80 forming the axle supports for the rear wheels 12. A cross member 82 is connected between the arms 54 at a point somewhat above the platform 10 and a threaded supporting post 83 is provided which is pivotally supported at its bottom end on a bracket 84 which is mounted on the rear wall of the mower housing 10 by suitable fasteners 85. The supporting post 83 extends through an opening in the cross member 82 and may be adjusted by means of the adjusting nuts 86 which may be threaded up and down along the threaded upper end of the rod 83. By varying the point along the rod 83 at which the cross member 82 is connected to this rod by the adjusting nuts 86, it is possible to adjust the angle at which the mower handle extends away from the mower housing over a relatively wide arc and thereby adjust the height of the mower handle grips 87 to suit the user.

In order to permit the power driven mower of the present invention manually to be wheeled freely over the ground so that the mower may be manually moved as desired, the free wheeling mechanism shown in detail in Figs. 4 to 8, inclusive, is provided. In this connection, it will be understood that the front wheel driving mechanism described in detail above includes the worm wheel assembly 21, and when an attempt is made to drive the assembly 21 backwards through the front wheel drive shaft 20, as when the mower is moved manually over the ground, the worm wheel assembly effectively locks the front wheels to prevent free wheeling movement of the mower. In the embodiment shown in Fig. 4, there is provided a free wheeling mechanism which may be manually actuated to release the front wheels 11 from the front wheel drive shaft 20 so that the mower may be manually wheeled to any desired position. As shown, this mechanism includes a pair of clutch mechanisms indicated generally at 90 which are positioned on the ends of the drive shaft 20 and may be simultaneously manually actuated by means of the control lever 95 through the control rods 97 and 99 and the forked control arms 101 and 103. The control lever 95 is pivotally supported by means of the pin 105 which is positioned on the housing 10, and the control rods 97 and 99 are pivotally connected to the control lever 95 on either side of the pivot pin 105.

Each of the clutch mechanisms 90 include a splined driving member 110 which is carried by the drive shaft 20 and is slidable therealong. The driving members 110 are provided with teeth 112 which are adapted to engage with corresponding notches 166 in a driven member 114. In the illustrated embodiment, the driven member 114 is made integral with the front wheel drive sprockets 22, the driven members 114 being supported for rotation on the ends of the shaft 20 by means of sleeve bearings 116, or the like. The clutch driving members 110 are biased outwardly into engagement with the driven members 114 by means of the coil springs 118, which are positioned between the driving members 110 and the collars 120 which are carried by the drive shaft 20. As shown in Figs. 5 and 6, if the forked ends of the control arms 101 and 103 are not in engagement with the outer flange portion of the driving members 110, power is transmitted from the drive shaft 20 through the clutch mechanisms 90 to the front wheel drive sprockets 22 so as to rotate the front wheels 11 of the mower.

Figure 4A:
Fig. 4A is a fragmentary side elevational view, partly in section and taken along the line 4A—4A in Fig. 4.

When the control lever 95 is in the position shown in full lines in Fig. 4, the forked ends of the control arms 101 and 103 are clear of the driving members 110 so that the clutch mechanisms 90 are engaged and the front wheels 11 are driven from the motor 15 in the manner described in detail above. The control lever 95 is held in the above-described position by means of a notched detent plate 106 which is secured to the platform 10 of the mower by any suitable means. When it is desired to disengage the front wheels 11 from the worm wheel assembly 21, the control lever 95 is lifted out of the notch in the detent member 106, as shown in dotted lines in Fig. 4A, and moved to the position shown in dotted lines in Fig. 4, at which position the control lever is dropped down behind the corner 107 of the detent member 106 to maintain the clutch mechanisms 90 disengaged. Preferably, the control lever 95 is biased downwardly by suitable spring means which may be positioned between the bolt 108 and the lever so as to maintain the control lever 95 in either of the indicated positions.

As shown in Fig. 6, when the control lever is moved to the clutch disengaging position, the forked ends of the control arms 101 and 103 engage the flange portions of the clutch driving members 110 and move these members inwardly to disengage the same from the driven members 114. Accordingly, the drive sprockets 22 are disengaged from the drive shaft 20 and the mower may be manually free wheeled to any desired position.

In a further alternate embodiment illustrated in Figs. 9, 10 and 11, the driven members 130 of the free wheeling clutch mechanisms include a flanged portion 132 which is of substantially the same outer diameter as the sprocket 168 and includes a plurality of notches 134 in the outer edge thereof of exactly the same configuration as corresponding portions of the sprocket teeth. The notches 134 are preferably formed in the flange 132 at the same time as the teeth of the sprocket 168 are cut, as by hobbing directly through both flange portions, so that an inexpensive and integral clutch and sprocket member is obtained. In the embodiment of Figs. 9, 10 and 11, the clutch driving members 136 are provided with inner and outer flanges 138 and 140 between which the control arms 142 are positioned. The flange portion 140 is provided with tooth portions 144 which engage the notched portions 134 of the flange 132. A coil spring 146 biases the driving member 136 into engagement with the driven member 130 in a manner entirely similar to that described above in connection with Figs. 4 to 8, inclusive. In accordance with a further feature of the alternate embodiment of Fig. 9, the control rod 170 is supported in a tubular element 150 which may be formed integral with the bearing 171 which supports the front wheel drive shaft 172 and the position of the control arm 142 may be varied by means of the double nuts 152 on the end of the control rod 170.

From the foregoing explanation it will be apparent that the present invention provides a simplified power driven lawn mower of the horizontal rotary cutter blade type in which the driving motor is directly connected to and continually rotates the horizontal cutter blade and wherein a novel drive mechanism having substantial speed reduction is employed to drive the mower wheels and thus propel the mower. Furthermore, the drive mechanism is disengageable from the driving motor by means positioned on the handle of the mower and, if desired, may also be disengaged from the front wheels of the mower to permit manual free wheeling thereof.

While there have been described what are at present considered to be the preferred embodiment of the invention, it will be understood that various modifications may be made therein which are within the true spirit and scope of the invention as defined in the appended claims.

What is claimed as new and desired to be secured by Letters Patent of the United States is:

1. In combination with a power driven lawn mower of the type having a platform, a handle mounted on said platform, wheels supporting said platform, motor means carried by said platform for propelling said lawn mower; means for controlling the transmission of power from said motor means to said wheels comprising a mower drive shaft extending across said platform to points adjacent a pair of said wheels, drive means including a driving connection on either end of said drive shaft and operatively connected to said pair of wheels, means including a speed reducing mechanism for drivingly connecting said motor means with said mower drive shaft, means operable from the handle of the mower for breaking the driving connection between said motor means and said mower drive shaft, and manually operable means for breaking the driving connection between said pair of wheels and said mower drive shaft, thereby to permit free wheeling of said mower.

2. In a power driven lawn mower of the type including a platform, a handle supported by said platform, front and rear wheels supporting said platform, motor means carried by said platform, for propelling said lawn mower and having a vertically disposed drive shaft one end of which extends downwardly through said platform for supporting a rotary cutting blade; means for controlling the transmission of power from said motor means to one of said sets of wheels comprising a mower drive shaft extending across the front end of said platform to points adjacent the front wheels of the mower, sprocket drive means on either end of said drive shaft and drivingly connected to said front wheels, a worm and worm wheel assembly carried on said mower drive shaft and adapted for pivotal movement about the axis of said mower drive shaft, means including a belt for driving said worm from said motor means, thereby to rotate said mower drive shaft and drive said front wheels, and means supported from said platform for pivoting said worm and worm wheel assembly about the axis of said mower drive shaft to loosen said belt and thus disengage said motor means from said mower drive shaft.

3. For use in a power driven lawn mower of the type including a platform having downwardly extending sides defining a substantially enclosed cutting zone, a handle secured to said platform, front and rear wheels supporting said platform, cutting means positioned within said zone, motor means carried by said platform for propelling said lawn mower and for rotating said cutting means; means for controlling the transmission of power from said motor means to one of said sets of wheels comprising a mower drive shaft extending across the front end of said platform to points adjacent the front wheels of the mower, sprocket drive means including a driving connection on either end of said drive shaft and drivingly connected to said front wheels, a worm and worm wheel assembly carried on said mower drive shaft and adapted for pivotal movement about the axis of said mower drive shaft, means including a belt for driving said worm from said motor means, thereby to rotate said mower drive shaft and drive said front wheels, means supported from said platform for pivoting said worm and worm wheel assembly about the axis of said mower drive shaft to loosen said belt and thus disengage said motor means from said mower drive shaft, and manually operable clutch means included in the driving connections between said drive shaft and said front wheels and selectively operable to break the driving connections between said drive shaft and said front wheels, thereby to permit free wheeling of said mower.

4. In a power driven lawn mower of the type including a platform having downwardly extending sides defining a substantially enclosed cutting zone, front and rear wheels supporting said platform, cutting means positioned within said zone, motor means carried by said platform for propelling said lawn mower and for rotating said cutting means; means for controlling the transmission of power from said motor means to one of said sets of wheels comprising a mower drive shaft extending across the front end of said platform to points adjacent the front wheels of the mower, drive sprockets on either end of said drive shaft and drivingly connected with said front wheels, a worm shaft and worm wheel assembly carried by said mower drive shaft and adapted for pivotal movement about the axis of said mower drive shaft, flexible linkage means drivingly connecting said motor means with the free end of said worm shaft, thereby to drive said mower drive shaft through said worm and worm wheel assembly, means supported from said platform and operable from the handle of the mower for pivoting said worm and worm wheel assembly about the axis of said drive shaft to loosen said flexible linkage means and thus break the driving connection between said motor means and said drive shaft, a driven clutch member connected to each of said drive sprockets, splined driving clutch members carried by said mower drive shaft and movable therealong, spring means normally biasing said driving and driven members into engagement, and manually operable control means supported from said platform for simultaneously moving said driving members inwardly toward each other along said drive shaft against the bias of said spring means to break the driving connection between said drive sprockets and said mower drive shaft, thereby to permit free wheeling movement of said mower.

5. In a power driven lawn mower of the type including a platform having downwardly extending sides defining a substantially enclosed cutting zone, a handle supported by said platform, front and rear wheels supporting said platform, cutting means positioned within said zone, motor means carried by said platform for propelling said lawn mower and for rotating said cutting means; means for controlling the transmission of power from said motor means to one of said sets of wheels comprising a mower drive shaft extending across the front end of said platform to points adjacent the front wheels of the mower, drive sprockets on either end of said drive shaft and drivingly connected with said front wheels, a worm shaft and worm wheel assembly carried by said mower drive shaft and adapted for pivotal movement about the axis of said mower drive shaft, flexible linkage means drivingly connecting said motor means with the free end of said worm shaft, thereby to drive said mower drive shaft through said worm and worm wheel assembly, means supported from said platform operable from the handle of the mower for pivoting said worm and worm wheel assembly about the axis of said drive shaft to loosen said flexible linkage means and thus disengage said motor means from said drive shaft, each of said drive sprockets having a flanged hub portion provided with notches in the periphery thereof corresponding to the sprocket teeth and acting as a driven clutch member, driving clutch members splined to said mower drive shaft and movable therealong, each of said driving clutch members being provided with clutch teeth engageable with said notches, spring means normally biasing said driving and driven members toward each other to engage said teeth with said notches, and manually operable control means supported from said platform for simultaneously moving said driving members inwardly toward each other along said drive shaft against the bias of said spring means to break the driving connection between said drive sprockets and said mower drive shaft, thereby to permit free wheeling movement of said mower.

References Cited in the file of this patent

UNITED STATES PATENTS

| | | |
|---|---|---|
| 2,298,135 | Klein | Oct. 6, 1942 |
| 2,523,439 | May | Sept. 26, 1950 |
| 2,582,177 | Swisher et al. | Jan. 8, 1952 |
| 2,689,620 | Hainke | Sept. 21, 1954 |